G. A. NORTON.
STEERING CONTROL FOR TRAILERS.
APPLICATION FILED MAY 15, 1918.
1,319,303.
Patented Oct. 21, 1919.
2 SHEETS—SHEET 1.
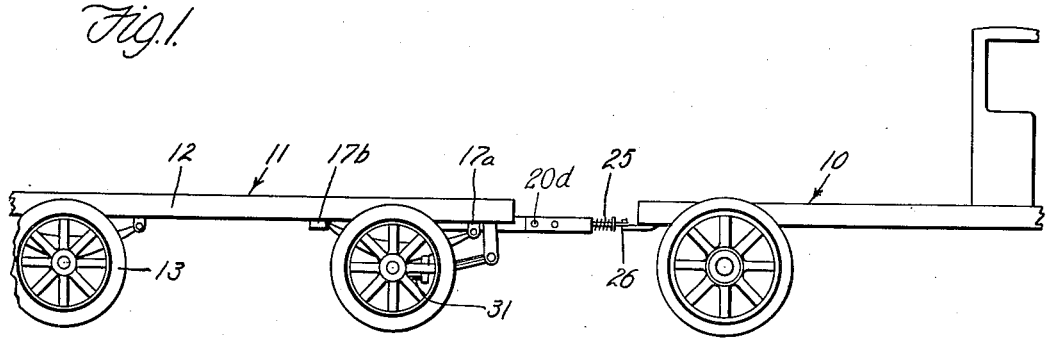
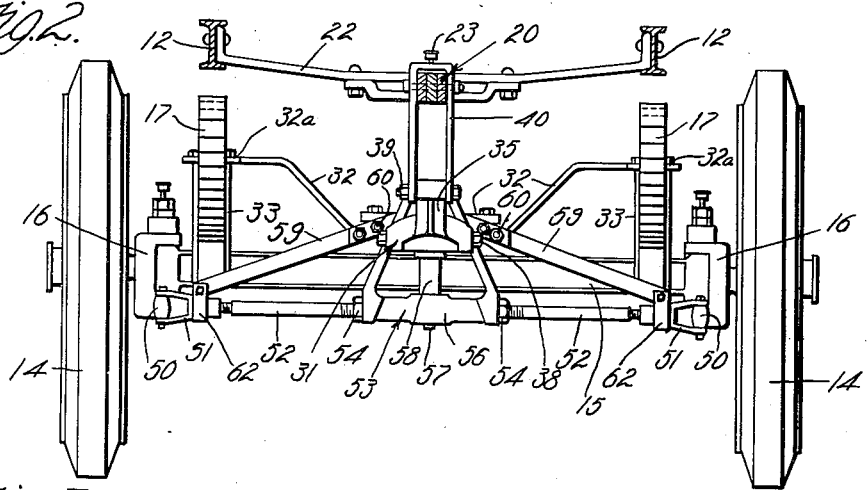
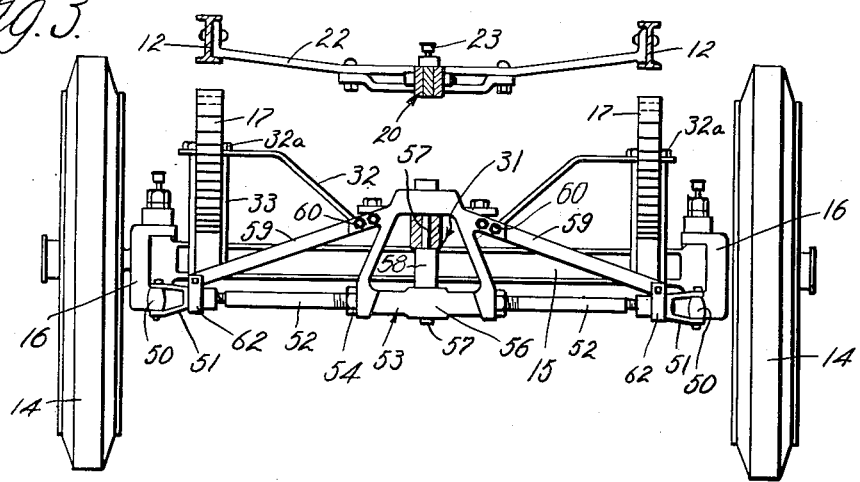
Inventor
Guy A. Norton
by James T. Barkeler
his Attorney G. A. NORTON.
STEERING CONTROL FOR TRAILERS.
APPLICATION FILED MAY 15, 1918.
1,319,303.
Patented Oct. 21, 1919.
2 SHEETS—SHEET 2.
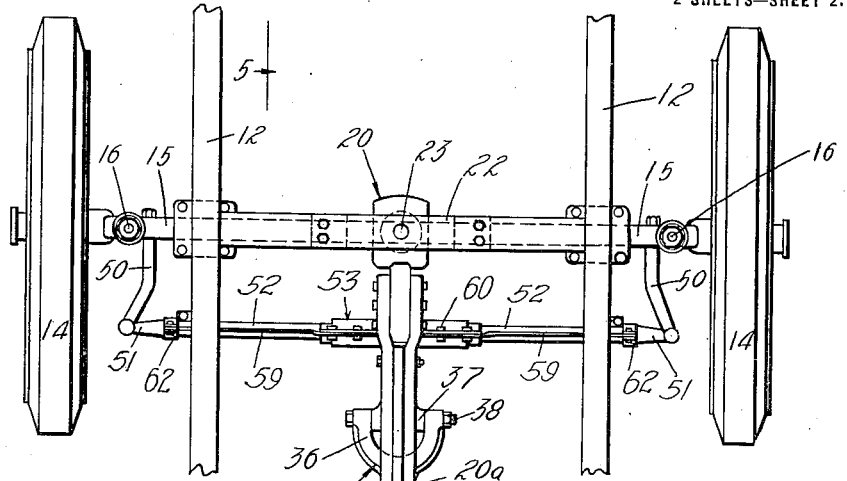
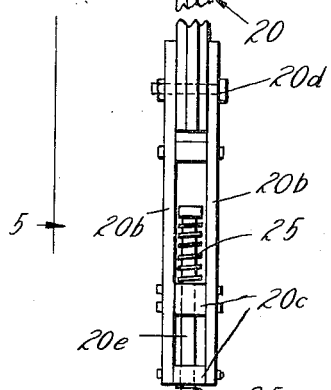
Fig. 4.
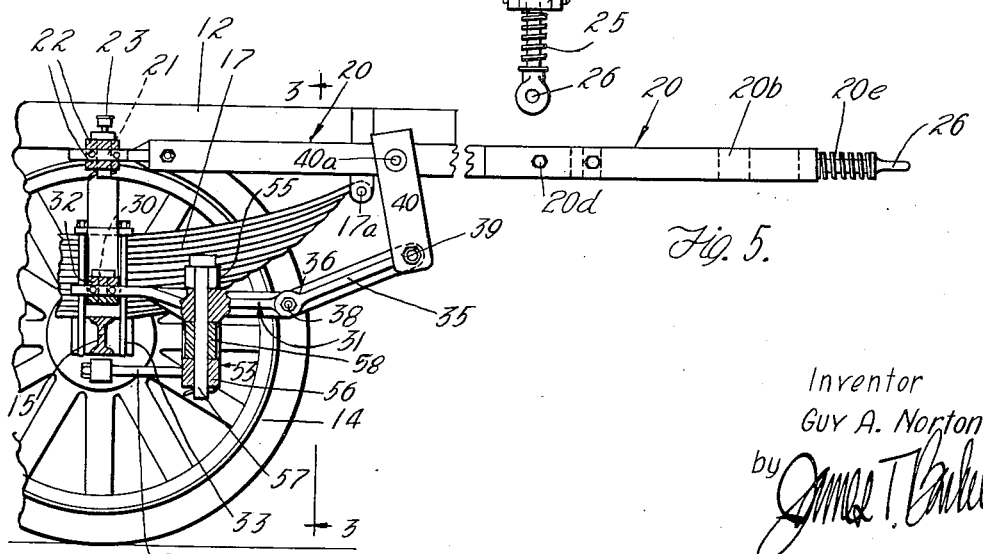
Fig. 5.
Inventor
Guy A. Norton
by
his Attorney

UNITED STATES PATENT OFFICE.

GUY A. NORTON, OF LOS ANGELES, CALIFORNIA, ASSIGNOR TO LOS ANGELES TRAILER COMPANY, OF LOS ANGELES, CALIFORNIA, A CORPORATION OF CALIFORNIA.

STEERING CONTROL FOR TRAILERS.

1,319,303.  Specification of Letters Patent.  Patented Oct. 21, 1919.

Application filed May 15, 1918. Serial No. 234,831.

*To all whom it may concern:*

Be it known that I, GUY A. NORTON, a citizen of the United States, residing at Los Angeles, in the county of Los Angeles, State of California, have invented new and useful Improvements in Steering Controls for Trailers, of which the following is a specification.

This invention relates to means for towing and steering trailers such as are drawn in trains behind an automobile truck; and it is an object of the invention to provide a simple, inexpensive and efficient form of steering control for the trailer, acting in conjunction and coöperation with the draw-bar or tongue, and which will at all times steer the trailer in a path directly behind the vehicle ahead. When the trailers are towed without a steering control, they have a very marked tendency to sway from side to side across the roadway; thus constituting a menace and danger to other persons traveling the roadway and limiting the speed at which such a trailer can be drawn. It is an object of this invention to provide an improved steering control which will so efficiently guide the trailer behind the towing vehicle that the trailer will follow approximately in the exact path of the vehicle ahead and will be prevented from swaying from side to side. As a result of this invention I have provided a trailer which may be towed at high speed without danger.

The invention will be best understood from the following description of a preferred form of device embodying the invention; reference being had for this purpose to the accompanying drawings in which—

Figure 1 is a side elevation illustrating a truck and a trailer being towed thereby, the trailer being equipped with my device; Fig. 2 is an enlarged front elevation of a trailer equipped with my steering control; Fig. 3 is a vertical sectional elevation taken as indicated by line 3—3 on Fig. 5; Fig. 4 is a plan of the forward part of the trailer with my steering control; and Fig. 5 is a vertical section taken as indicated by line 5—5 on Fig. 4.

In the drawings the numeral 10 designates a truck which tows the trailer 11. (Of course it will be understood that the trailers may be towed in trains of any suitable number; so that a trailer instead of being connected directly to the truck 10 may be connected to another trailer 11.) The trailer itself may be constructed in any manner, and in accordance with any desired design; the details of construction of the trailer frame 12, its rear wheels 13 and their mountings, etc., have no bearing upon the present invention. So likewise the details of construction and arrangement of the mountings of front wheels, the front axle 15, the steering knuckles 16, supporting springs 17, etc., have no particular bearing upon the present invention, except as hereinafter specified in the details of my invention, although I have shown my device as applied to a particular design of such type. However, it will be understood that my invention is not at all limited to the particular design, proportions and arrangements of such trailer parts whose design may be varied in different trailers. And it will be understood from the following description of the parts of my device which more specifically appertain to the invention that I do not limit myself to the specific design and arrangements and details of such parts.

Draw-bar 20 is pivoted on a king pin 21 mounted upon and between cross members 22 and provided with a lubricating cup 23. This draw-bar is preferably constructed in the manner shown in the drawings, the main portion of the draw-bar being formed of three flat bars as shown at 20$^a$ secured together by any suitable means. At the forward end of the main portion of the draw-bar there is a part made up of two side bars 20$^b$ with blocks 20$^c$ between them at their forward ends, this part forming a sort of yoke which is pivoted at 20$^d$ to the forward end of the draw-bar 20. A coupler pin 20$^e$ is mounted to slide longitudinally in the blocks 20$^c$ and two springs 25 are placed to absorb longitudinal shocks; an eye 26 being formed on the forward end of pin 20$^e$ for attachment to the vehicle ahead.

At 30 there is a pin forming a pivot for the steering bar 31 which is directly below draw-bar 20; and pivot 30 is directly below pivot 21. Both draw-bar 20 and steering bar 31 may have annular ball bearings around the pins 21 and 30, respectively, to reduce friction and wear.

Pivot pin 30 is mounted upon transverse brackets or supports 32 which extend across between the springs 17. In fact, the outer ends of this bracket 32 form a part of the spring clamp yoke, as indicated at 32ª. Yoke bolts 33 of the spring clamps extend down on opposite sides of springs 17 and extend around and under parts of the axle 15. It will be seen that the steering bar is pivoted on a part which moves directly with the axle; that is, the steering bar pivot is in immovable relation with reference to the axle. At the same time, it will be seen that the draw-bar pivot, being mounted on the frame, is movable vertically with relation to the axle, due to the action of the supporting springs 17. In order to accommodate this relative vertical movement, and at the same time, to cause steering bar 31 to swing horizontally at all times with draw bar 20, I provide an arrangement embodying an equalizer link 35, whose rear end is provided with a yoke 36, which fits upon a transversely widened pivot pin boss 37 on the forward end of steering bar 31. Pivot pin 38 is comparatively long and has a long bearing in the forward end of steering bar 31 and yoke 36 gives widely spaced bearing points for the equalizer link on the pivot pin. At its forward end equalizer link 35 is pivoted on a pivot pin 39 mounted across and between the two dependent ends of a yoke 40, which fits over and is bolted securely to draw bar 20; so that this dependent yoke 40 moves rigidly sidewise with the draw bar. The yoke has a swinging movement forward and backward at its lower end on bolt 40ª as a pivot. When the frame is unloaded the parts stand about as illustrated. When the frame is loaded, and when it moves down on the springs, then yoke 40 moves back to a more nearly vertical position. The forward ends of springs 17 are pivoted at 17ª and their rear ends slide in a member 17ᵇ. In such a construction downward movement of the frame causes rearward movement of the axle; and swinging yoke 40 takes care of this. Or the swinging yoke takes care of any such relative movement of frame and axle, regardless of what the specific spring arrangement may be; and also takes care of the vertical rocking motion of link 35 around the pivot 38.

The drawings show the trailer in its unloaded position. When the trailer is normally loaded the frame moves down to where the equalizer link is somewhat more nearly in a normal position. It will be seen that the construction and connections of this equalizer link are such that although the link allows a free relative vertical movement between the draw-bar and the steering bar, yet the connection between the draw-bar and the steering bar is rigid and positive as regards lateral swinging motion, so that the steering bar at all times swings horizontally with the draw-bar. This connective arrangement also allows the draw-bar to be placed at a relatively high elevation so as to pull directly between the frames of the two vehicles, and allows the steering bar to be placed below the draw bar and more nearly in the line of the wheel axle.

Each wheel is mounted upon the steering knuckle 16 and each steering knuckle has a forwardly projecting steering arm 50. The centers of the steering knuckles 16 are on a transverse line with the centers 21 and 30. A transverse connecting bracket structure is extended between the forward ends of the arms 50. A connecting yoke 51 is pivoted directly to each arm 50 and to these yokes rods 52 are screw-threadedly attached. The inner ends of rods 52 are screw-threaded into the lower part of a central transverse bracket 53. These rods may be threaded right and left at their ends, so that by turning them the lengths may be varied to adjust the proper position of the steering wheels; lock nuts 54 being provided on the rods to hold them after adjustment. The bracket 53 extends over steering rod 31, as shown at 55 and its lower part 56 (into which rods 52 are screw-threaded) is on a line with the two steering arms 50 and beneath steering bar 31. A pivot pin 57 passes through the upper and lower parts of this bracket and also through the steering bar and a spacer sleeve 58 is used between the steering bar and the lower part 56 of the bracket. In order to make this transverse connection stiff and rigid, diagonal braces 59 are connected at their inner ends at 60 to the upper part of bracket 53 and extend downwardly and outwardly and have their outer ends connected to the yokes 51, small clamps 62 being used which are somewhat adjustable on the yokes to adjust the connections of the braces to the yokes whenever the rods 52 are adjusted. The transverse connecting structure thus provides a rigid, vibrationless connection of fixed length transversely between the two steering arms 50 and provides for the proper transmission of movement from steering bar 31 to the two steering arms, although the steering bar is located in a plane somewhat above the plane of the steering arms. Furthermore, it will be seen that the front wheels may be accurately adjusted to be in proper alinement with each other and each with the steering arm (each being independently adjustable with relation to the arm), and the relative position of the wheels, once set, remains the same regardless of any vertical movement of the draw-bar, connecting link, etc.

Now, although I have proceeded to describe a preferred form of my invention in some detail and particularity, it will be understood that I do this for the purpose of rendering my invention most clearly intelligible and not for the purpose of limiting my invention to the specific details herein set forth. Rather do I believe the invention to be broad in its nature, within the limits set forth in the appended claims; and I therefore reserve to myself all such changes and modifications as may occur to those skilled in the art, or as may fall within the scope of the following claims.

Having described a preferred form of my invention, I claim:

1. In combination with a trailer having steering wheels, a frame mounted on the wheels, and a draw-bar pivoted on the frame, a connecting member connected to and extending across between the steering wheels whereby they are steered, a pivoted steering bar below the draw-bar pivotally connected to the said connecting member, and a connection between the draw-bar and the steering bar comprising a yoke mounted on the draw-bar and depending therefrom with its lower end substantially in the normal horizontal plane of the steering bar, and a substantially normally horizontal connecting link having its forward end pivoted on a horizontal transverse pivot between the lower ends of the yoke and connected at its rear end to the forward end of the steering bar by a transverse horizontal pivot, so that said link by its pivotal action allows relative vertical movement between the draw-bar and steering bar and causes them to swing horizontally together.

2. In combination with a trailer having steering wheels, a frame mounted on the wheels, and a draw-bar pivoted on the frame, a connecting member connected to and extending across between the steering wheels whereby they are steered, a pivoted steering bar below the draw-bar pivotally connected to the said connecting member, and a connection between the draw-bar and the steering bar comprising a member mounted on the draw-bar on a pivot transverse thereto and depending from the draw-bar, and a horizontally extending connecting link having one end pivoted to the free end of the said member on a pivot allowing swinging motion of the links in a vertical plane and having its other end pivotally connected to the steering bar on a horizontal transverse pivot, so that said member and link by their pivotal actions allow relative vertical movement between the draw-bar and steering bar and cause them to swing horizontally together.

In witness that I claim the foregoing I have hereunto subscribed my name this 2d day of May, 1918.

GUY A. NORTON.

Witness:
VIRGINIA I. BERINGER.